United States Patent
Saito

(10) Patent No.: US 8,923,560 B2
(45) Date of Patent: Dec. 30, 2014

(54) EXTERIOR ENVIRONMENT RECOGNITION DEVICE

(71) Applicant: Fuji Jukogyo Kabushiki Kaisha, Tokyo (JP)

(72) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 124 days.

(21) Appl. No.: 13/771,049

(22) Filed: Feb. 19, 2013

(65) Prior Publication Data

US 2013/0223689 A1    Aug. 29, 2013

(30) Foreign Application Priority Data

Feb. 28, 2012    (JP) ................................. 2012-042272

(51) Int. Cl.
   *G06K 9/00* (2006.01)
   *G06T 7/00* (2006.01)

(52) U.S. Cl.
   CPC .......... *G06K 9/00791* (2013.01); *G06T 7/0075* (2013.01); *G06T 2207/30261* (2013.01)
   USPC .......................................... 382/103; 382/154

(58) Field of Classification Search
   USPC .......... 382/103, 104, 105, 106, 107, 154, 285
   See application file for complete search history.

(56) References Cited

U.S. PATENT DOCUMENTS

| 2005/0058350 A1* | 3/2005 | Dugan et al. ................... 382/224 |
| 2007/0081723 A1* | 4/2007 | Aboutalib et al. ............ 382/170 |
| 2011/0170748 A1* | 7/2011 | Aimura et al. ................. 382/106 |
| 2012/0041617 A1* | 2/2012 | Aimura et al. .................... 701/1 |

FOREIGN PATENT DOCUMENTS

| JP | 10-117339 A | 5/1998 |
| JP | 3349060 B2 | 11/2002 |
| JP | 2008-039491 A | 2/2008 |

* cited by examiner

*Primary Examiner* — Brian Le
(74) *Attorney, Agent, or Firm* — McDermott Will & Emery LLP

(57) ABSTRACT

Provided is an exterior environment recognition device including: a parallax deriving unit for obtaining parallax by means of the pattern matching; a position information deriving unit for deriving a relative distance from the parallax; a grouping unit for grouping a block of which difference of the relative distance is included within a predetermined range, and specifying specified objects; a specified object selection unit for selecting a specified object; an offset amount deriving unit for, when the relative distance of the selected specified object becomes less than a threshold value determined in advance, deriving an amount of offset in accordance with the relative distance; and an offset execution unit for offsetting the image by the amount of offset. When the amount of offset is not zero, the position information deriving unit limits deriving of the relative distance in an image other than an image range corresponding to the selected specified object.

17 Claims, 15 Drawing Sheets

REFERENCE IMAGE

COMPARISON IMAGE

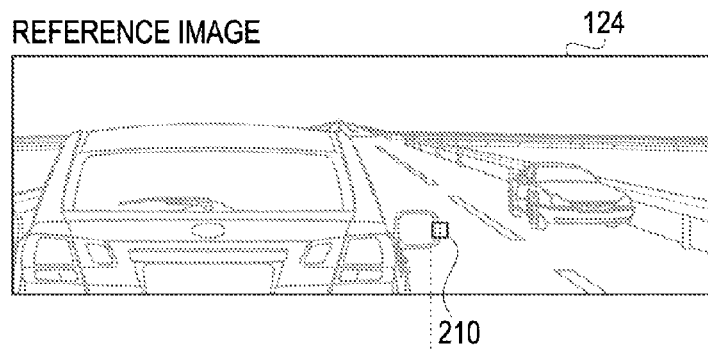
FIG. 6A
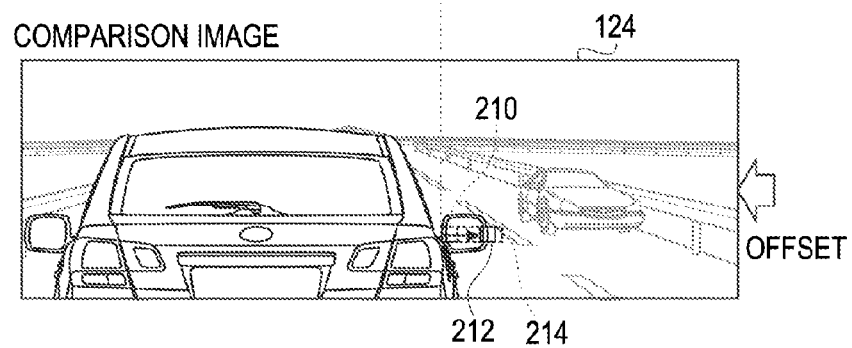
FIG. 6B
FIG. 7
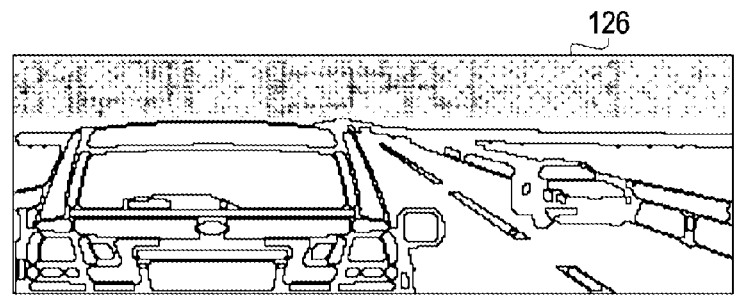

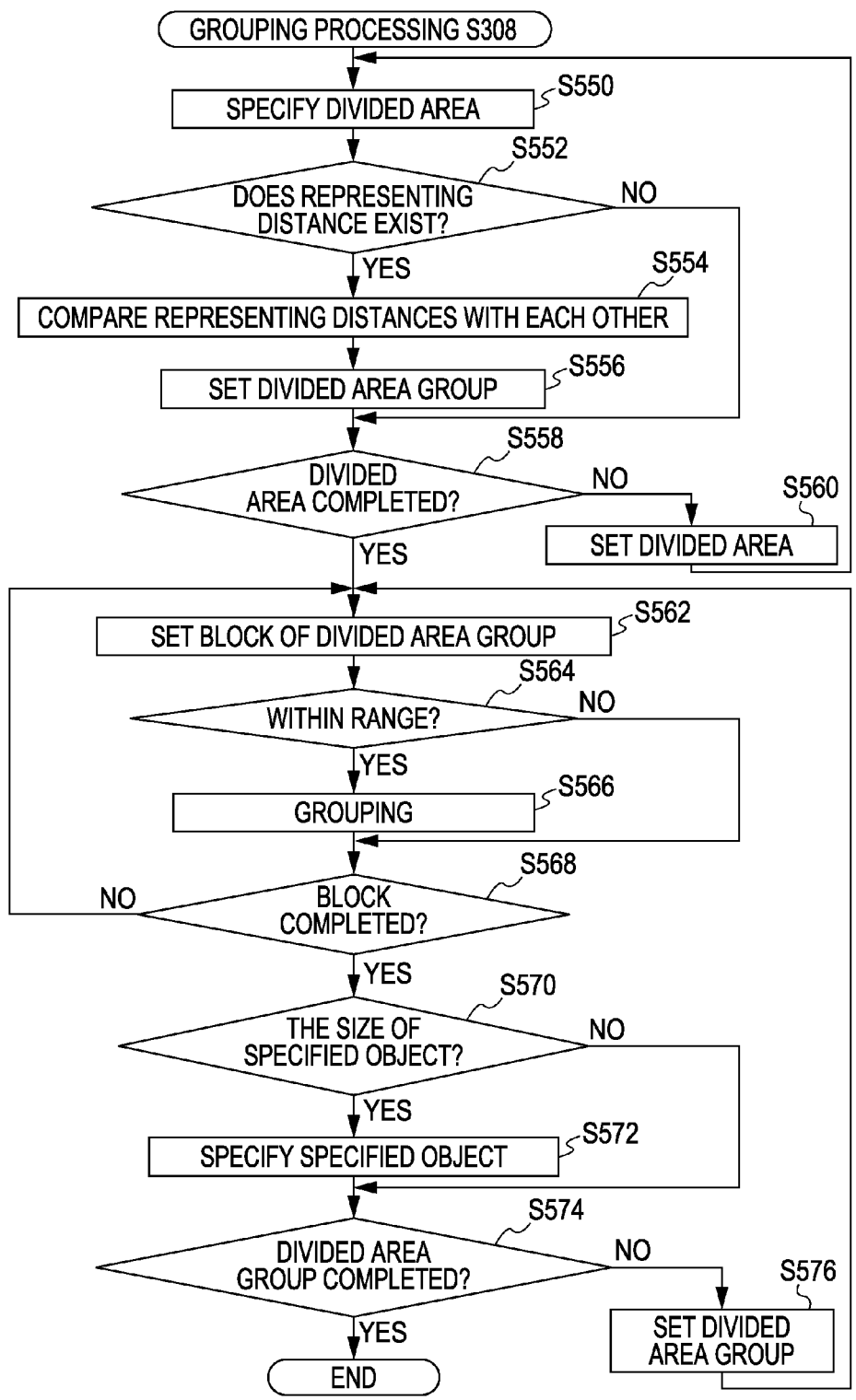

EXTERIOR ENVIRONMENT RECOGNITION DEVICE

CROSS-REFERENCE TO RELATED APPLICATIONS

The present application claims priority from Japanese Patent Application No. 2012-042272 filed on Feb. 28, 2012, the entire contents of which are hereby incorporated by reference.

BACKGROUND OF THE INVENTION

1. Field of the Invention

The present invention relates to an exterior environment recognition device for recognizing environment outside of a subject vehicle.

2. Description of Related Art

Conventionally, a technique has been known that detects a specified object such as a vehicle and an obstacle located in front of a subject vehicle to avoid collision with the detected specified object (collision avoiding control) and performs control so as to maintain a safe distance between the subject vehicle and a preceding vehicle (cruise control) (for example, Japanese Patent No. 3349060).

In order to perform, e.g., the collision avoiding control and the cruise control, a relative distance of the specified object located in front of the subject vehicle such as a preceding vehicle with respect to the subject vehicle is obtained. For example, such relative distance is obtained by causing two imaging devices (stereo cameras) having different stereo axes to capture a specified object, obtaining correlation between the two images, and obtaining the relative distance by means of stereo method (triangulation method) using parallax of the same specified object, attachment positions of the two imaging devices, and camera parameters such as a focal length.

In order to obtain the parallax according to the stereo method, it is necessary to correctly detect corresponding points representing the same specified object by performing pattern matching between images. As the pattern matching, corresponding points search method is generally employed, in which an image captured by one of the imaging devices is adopted as a reference image, and an image captured by the other of the imaging devices is adopted as a comparison image. In such corresponding points search method, any block (also referred to as a window) including one or more pixels in the reference image is set, and in the comparison image, a block highly correlated with the block (corresponding points) is searched. Then, the block with the highest correlation is adopted as the corresponding points, and the parallax of the coordinates between the blocks (the amount of displacement) is associated with the relative distance, and each processing is executed to perform the collision avoiding control, the cruise control, and the like.

In order to reduce the processing load in the pattern matching, a technique has been disclosed (for example, Japanese Unexamined Patent Application Publication (JP-A) No. 2008-39491). In the technique, during the pattern matching, vertical and horizontal sizes of the target image are reduced ½, and the stereo processing is performed on the reduced image, so that the amount of calculation is suppressed. A technique for reducing a search time is known (for example, JP-A No. H10-117339), by estimating a range of the parallax in accordance with the distance of the object and limiting the search range of the pattern matching to an estimated range.

However, even when the technique described in JP-A No. 2008-39491 is used, and all the specified objects including those at a close distance to those at a far distance are adopted as targets, it is necessary to have two images including an image for detecting a specified object at a distance and an image obtained by reducing the vertical and horizontal size by ½ for detecting a specified object closely located, and as a result, the processing load required for recognizing the image increases by 1.25 times. In the technique described in JP-A No. H10-117339, the size of the search range is changed in accordance with the distance to the specified object, but when the specified object is located in proximity, the processing load is not reduced, and in the loop processing for repeating the same processing with a regular interval, it is necessary to ensure a time for the processing load. Therefore, the processing load cannot be reduced drastically.

Accordingly, the inventor of the present application has found that it is possible to stably detect even a specified object located in proximity while the processing load is maintained, as long as only the position of the search range (the amount of offset) is changed without changing the size of the search range of the corresponding points in accordance with the distance to the specified object. However, when the search range of the comparison image is offset by the amount of offset in order to change the amount of offset of the search range, the parallax of the specified object at a far distance may be reversed at the right and the left, and in such case, the specified object at a far distance, which should be detected, cannot be detected. When, under circumstances where occurrence of an undetectable area due to the offset as described above is expected in advance, the pattern matching is performed for that area, this may cause false detection and increases the time it takes for the processing, which unnecessarily increases the processing load.

BRIEF SUMMARY OF THE INVENTION

The present invention is made in view of such problems, and it is an object of the present invention to provide an exterior environment recognition device capable of stably detecting even a specified object closely located, without unnecessarily increasing the processing load.

An aspect of the present invention provides an exterior environment recognition device including: an image data obtaining unit for obtaining two pieces of image data generated by two image-capturing units of which stereo axes are on a same plane but provided at different positions; a parallax deriving unit for comparing the two pieces of image data, extracting a block highly correlated with any given block including one or more pixels in an image based on one of the image data, from a search range, of which size is determined in advance, in an image based on the other of the image data, and obtaining parallax of both of the blocks; a position information deriving unit for deriving a relative distance of the block from the parallax; a grouping unit for grouping a block of which difference of the relative distance is included within a predetermined range, and specifying one or more specified objects; a specified object selection unit for selecting a specified object which is to be a tracking target, from the one or more specified objects; an offset amount deriving unit for, when the relative distance of the selected specified object, which is the specified object that has been selected, becomes less than a threshold value determined in advance, deriving an amount of offset for offsetting the search range in accordance with the relative distance; and an offset execution unit for offsetting the search range based on one of the two pieces of image data by the amount of offset. When the amount of offset is not zero, the position information deriving unit limits deriving of the relative distance in an image other than an image range corresponding to the selected specified object.

Regardless of the relative distance of the selected specified object, the offset execution unit may offset the image in areas determined in advance at both ends in the horizontal direction of the image based on the image data, by the amount of offset determined in advance.

Regardless of the relative distance of the selected specified object which is the specified object, the offset execution unit may offset the search range by the amount of offset determined in advance, for a cycle determined in advance.

The offset execution unit may offset the search range only in an image range corresponding to the selected specified object among the image based on the image data.

The offset amount deriving unit may derive a relative speed of the selected specified object from the two pieces of image data taken at different times, and derives the amount of offset on the basis of the relative speed and the relative distance of the selected specified object.

The position information deriving unit may limit deriving of the relative distance in an image other than an image range corresponding to the selected specified object, only when the relative distance of the specified object is less than the amount of offset.

BRIEF DESCRIPTION OF THE SEVERAL VIEWS OF THE DRAWINGS

FIGS. 6A and 6B are explanatory diagrams for explaining relationship between a search range and corresponding points;

FIG. 7 is an explanatory diagram for explaining relationship between a search range and corresponding points;

FIG. 20 is a flowchart illustrating a flow of grouping processing.

DETAILED DESCRIPTION OF THE INVENTION

Figure 1:
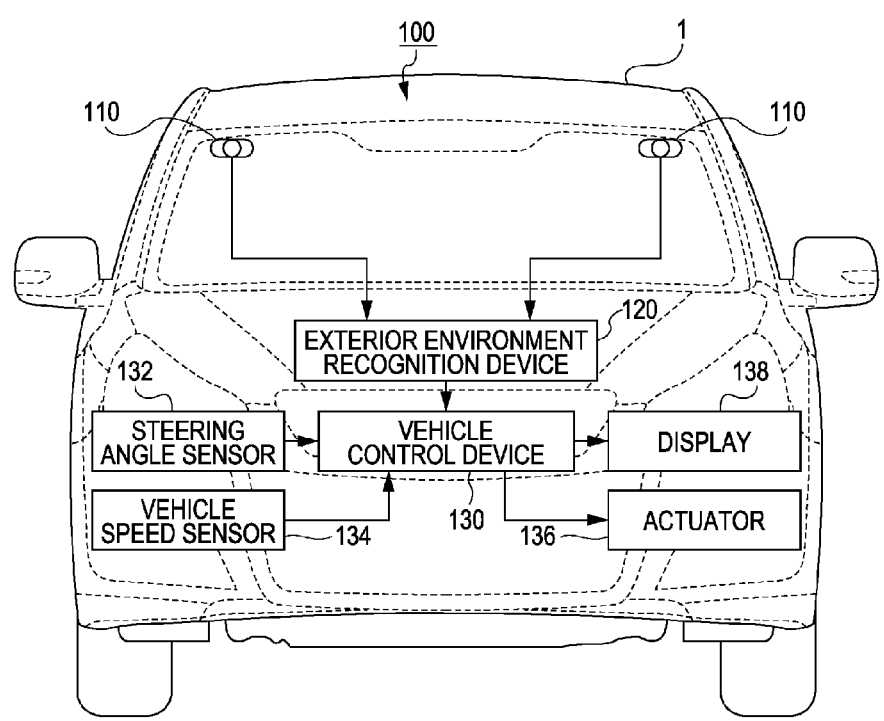
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings.

(Environment Recognition System 100)

FIG. 1 is a block diagram illustrating connection relationship in an environment recognition system 100. The environment recognition system 100 includes a plurality of imaging devices (imaging units) 110 (two imaging devices 110 in the present embodiment), an exterior environment recognition device 120, and a vehicle control device 130 that are provided in a subject vehicle 1.

The imaging devices 110 include an imaging element such as a CCD (Charge-Coupled Device) and a CMOS (Complementary Metal-Oxide Semiconductor), and can obtain luminance of a monochrome image. In this case, a monochrome image captured by the imaging devices 110 is referred to as luminance image and is distinguished from a distance image to be explained later.

The imaging devices 110 are disposed to be spaced apart from each other so that, at a side in which the subject vehicle 1 advances, stereo axes (optical axes) of the two imaging devices 110 are located at different positions in the same horizontal plane and are substantially parallel in a proceeding direction of the subject vehicle 1. The imaging device 110 continuously generates image data obtained by capturing an image of a specified object existing in a detection area in front of the subject vehicle 1 at every 1/60 seconds (60 fps), for example. Each later-described functional unit in the embodiment performs processing in response to the update of such image data. Accordingly, each functional unit repeats processing in units of frames, and expressions, i.e., "previous frame" or "subsequent frame", indicate a time point of processing of one frame ahead or one frame before. In this case, the specified object means objects existing independently such as a vehicle, a road, and a guardrail.

The exterior environment recognition device 120 uses so-called pattern matching to derive parallax. In the pattern matching, image data are obtained from each of the two imaging devices 110, and a block corresponding to any block (in this case, the block is constituted by an arrangement including four horizontal pixels by four vertical pixels) extracted from an image based on one of the image data is extracted from an image based on the other of the image data. In this embodiment, the horizontal direction used in the explanation about the block means a horizontal direction for the captured image, and corresponds to the width direction in the real world. On the other hand, the "vertical" direction means a vertical direction for the captured image, and corresponds to the height direction in the real world.

One way of performing the pattern matching is to compare luminance values between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation) adopting the degree of similarity of dispersion values obtained by subtracting a mean luminance value from a luminance value of each pixel. In the present embodiment, in particular, the luminance values are compared based on image textures. The exterior environment recognition device 120 performs such parallax deriving processing on all the blocks appearing in the detection area (for example, 600 pixels by 200 pixels). In this case, the block is assumed to include 4 pixels by 4 pixels, but the number of pixels in the block may be set at any value. The procedure for deriving parallax according to such pattern matching will be explained later in detail.

Although the exterior environment recognition device 120 can derive, by means of pattern matching, a parallax for each block serving as a detection resolution unit, it is impossible to recognize what kind of specified object the block belongs to. Therefore, the parallax information is not derived by the specified object, but is independently derived by the resolution (for example, by the block) in the detection area. In this embodiment, an image obtained by associating the parallax information thus derived (corresponding to a later-described relative distance) with image data is referred to as a distance image.

Figure 2A:
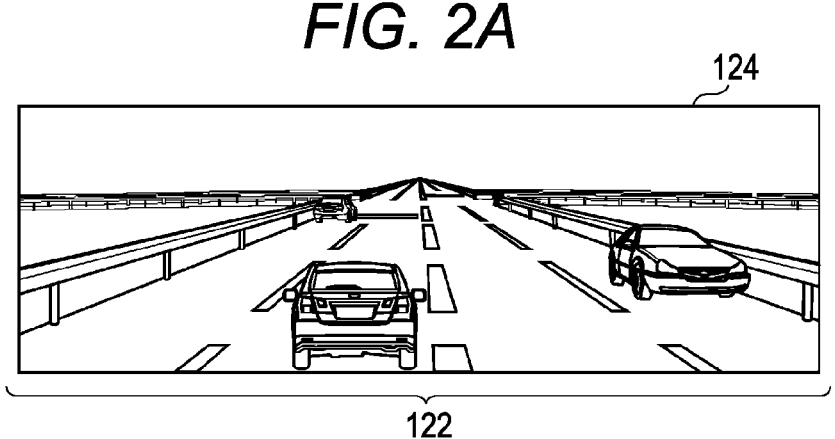
FIGS. 2A and 2B are explanatory diagrams for explaining a luminance image and a distance image.
Figure 2B:
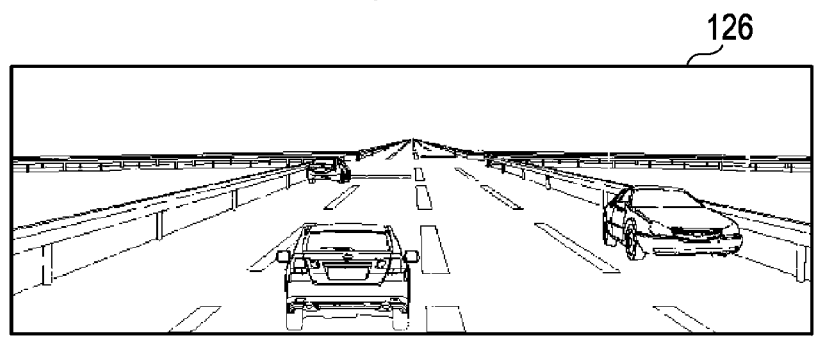

FIGS. 2A and 2B are explanatory diagrams for explaining a luminance image 124 and a distance image 126. For example, assume that the luminance image (image data) 124 as shown in FIG. 2A is generated with regard to a detection area 122 by the two imaging devices 110. Here, for the sake of easy understanding, only one of the two luminance images 124 is schematically shown. The exterior environment recognition device 120 obtains a parallax for each block from such luminance image 124, and forms the distance image 126 as shown in FIG. 2B. Each block of the distance image 126 is associated with a parallax of the block. In the drawing, for the sake of explanation, a block of from which a parallax is derived is indicated by a black dot.

The parallax can be easily specified at the edge portion (portion where there is contrast between adjacent pixels) of objects, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each specified object.

Then, the exterior environment recognition device 120 uses the relative distance with the subject vehicle 1 based on the distance image 126 to determine which specified object the specified object displayed in the detection area 122 corresponds to. For example, the specified object maintaining predetermined relative distance (running at the same speed as the subject vehicle) is recognized as a preceding vehicle.

It should be noted that the above relative distance with the subject vehicle 1 based on the distance image 126 can be obtained by converting parallax information for each block in the distance image 126 into three-dimensional position information using a so-called stereo method. The stereo method is a method using a triangulation method to derive a relative distance of a specified object with respect to the imaging device 110 from the parallax of the specified object. Processing performed by the exterior environment recognition device 120 will be explained later in detail.

The vehicle control device 130 avoids a collision with the specified object specified by the exterior environment recognition device 120 and performs control so as to maintain a safe distance from the preceding vehicle. More specifically, the vehicle control device 130 obtains a current cruising state of the subject vehicle 1 based on, for example, a steering angle sensor 132 for detecting an angle of the steering and a vehicle speed sensor 134 for detecting a speed of the subject vehicle 1, thereby controlling an actuator 136 to maintain a safe distance from the preceding vehicle. The actuator 136 is an actuator for vehicle control used to control a brake, a throttle valve, a steering angle and the like. When collision with a specified object is expected, the vehicle control device 130 displays a warning (notification) of the expected collision on a display 138 provided in front of a driver, and controls the actuator 136 to automatically decelerate the subject vehicle 1. The vehicle control device 130 can also be integrally implemented with the exterior environment recognition device 120.

(Pattern Matching)

However, as described above, the exterior environment recognition device 120 searches a block of corresponding points from a predetermined search range by performing the pattern matching.

Figure 3A:
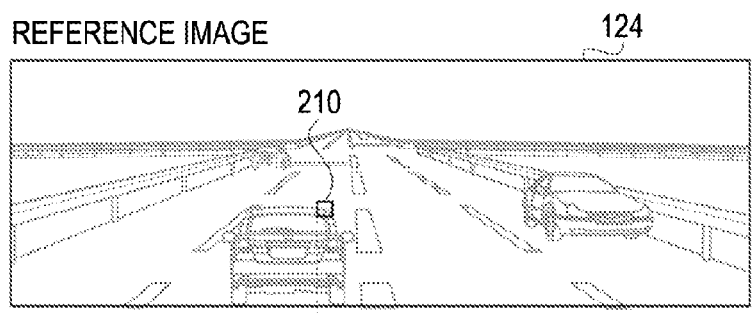
FIGS. 3A and 3B are explanatory diagrams for explaining relationship between a search range and corresponding points.
Figure 3B:
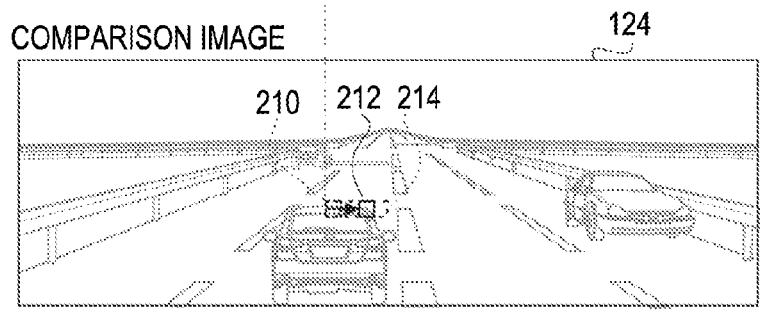

FIGS. 3A to 7 are explanatory diagrams for explaining relationship between a search range and corresponding points. FIG. 3A illustrates an image based on image data obtained from the imaging device 110 which is located at the right side of the subject vehicle 1. FIG. 3B illustrates a luminance image 124 based on image data obtained from the imaging device 110 which is located at the left side of the subject vehicle 1. In this case, the former is referred to as a reference image, and the latter is referred to as a comparison image.

In the imaging devices 110 of which stereo axes are different, the same specified object is displayed at different positions in the horizontal direction. For example, a block (corresponding points) 212 of the comparison image (FIG. 3B) having a high degree of correlation with a block 210 displayed in the reference image of FIG. 3A is located at the right side with respect to the position corresponding to the block 210 in the horizontal direction. Accordingly, the search range 214 in which corresponding points are searched can be narrowed down to the right side of the position corresponding to the block 210. In the present embodiment, the detection area 122 includes 600 horizontal pixels and 200 vertical pixels, and in order to unnecessarily increase the processing load, for example, the search range 214 in the horizontal direction includes 128 pixels, and the search range 214 in the vertical direction includes 4 pixels.

For example, when the camera parameters of the two imaging devices 110 according to the present embodiment are as follows: the distance between the two imaging devices 110=350 mm, the focal length of the lens of the imaging device 110=8 mm, and the amount of displacement per pixel=0.006 mm, then the relative distance that can be detected with the maximum value of 128 pixels of the search range 214 is as follows: 350 mm×8 mm/128 pixels/0.006 mm=3646 mm≈3.6 m. Therefore, even when the search range 214 is limited to 128 pixels like the present embodiment, all specified objects can be detected as long as they are at least 3.6 m away.

However, it is not impossible that a specified object may exist with a relative distance of less than 3.6 m. Accordingly, in order to detect a specified object with a relative distance of less than 3.6 m, the search range 214 may be increased twice, or the image itself may be reduced by ½ and only a specified object of less than 3.6 m may be separately detected, but this increases the processing load. In the present embodiment, without changing the size of the image itself and the search range 214, the search range 214 itself is moved and a specified object located in proximity is detected.

Figure 4A:
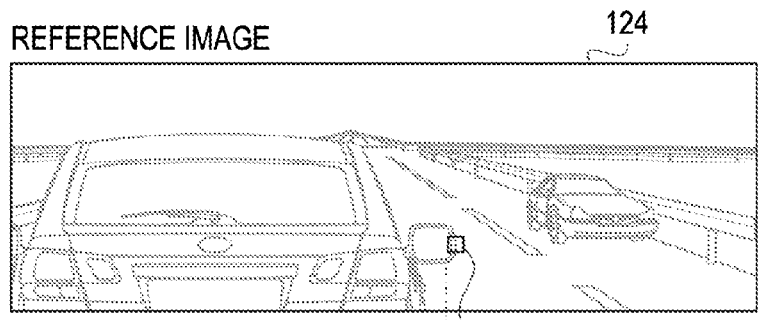
FIGS. 4A and 4B are explanatory diagrams for explaining relationship between a search range and corresponding points.
Figure 4B:
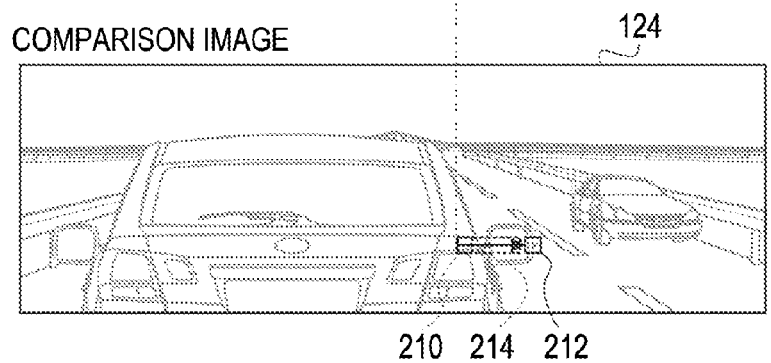

For example, like FIGS. 3A and 3B, FIGS. 4A and 4B illustrate images based on image data obtained from the imaging devices 110 located at the right and the left sides of the subject vehicle 1. However, unlike FIGS. 3A and 3B, FIGS. 4A and 4B illustrate a state where a specified object is located with a relative distance of less than 3.6 m. Accordingly, the block (corresponding points) 212 in the comparison image as illustrated in FIG. 4B having a high degree of correlation with the block 210 displayed on the reference image of FIG. 4A is located at the right side with respect to the position corresponding to the block 210 by more than 128 pixels (for example, 160 pixels).

Figure 5:
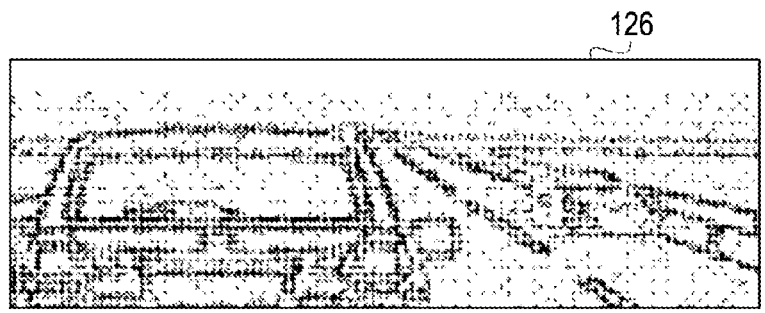
FIG. 5 is an explanatory diagram for explaining relationship between a search range and corresponding points.

When the pattern matching is performed under such circumstances, the distance image 126 as illustrated in FIG. 5 is obtained. In this case, most of the pixels in the image have parallax of 128 pixels or more, and therefore, no corresponding point can be detected within the search range 214, and another block that is hardly correlated is falsely detected as corresponding points, and the relative distance is randomly represented.

In the present embodiment, using a relative distance of a specified object found in advance with the tracking function of the specified object, the specified object is expected to have parallax of about 160 pixels. Then, the search range of the comparison image of FIG. 4B is offset in the left direction by 160−96=64 pixels and brought into the corresponding relationship as illustrated in FIG. 6, so that the corresponding points can be detected around 96 pixels, for example.

In this case, the reason why the target value of the position where a corresponding point appears is set as 96 pixels is that when the target value is too high, the corresponding point may be more than 128 pixels which is the upper limit of the search range 214, and when the target value is too low, the application of the offset according to the present embodiment is too early (even though the specified object is not located so closely, it is offset), and this unnecessarily makes it impossible to detect far distance. Accordingly, in the present embodiment, the target value is set as 96 pixels, which is ¾ of 128 pixels, the upper limit of the search range 214. 96 pixels correspond to a relative distance of 4.9 m with the above camera parameters.

As described above, in view of the relative distance of the specified object, the search range of the comparison image is offset, whereby the comparison image as illustrated in FIG. 4B is made into what is illustrated in FIG. 6B. The block (corresponding points) 212 in the comparison image as illustrated in FIG. 6B having a high degree of correlation with the block 210 displayed on the reference image of FIG. 6A is located at the right side with respect to the position corresponding to the block 210 by less than 128 pixels (for example, 96 pixels).

Then, the corresponding point is identified at the position of, e.g., 96 pixels, and thereafter, the amount of offset (for example, 64 pixels) is added, so that the true parallax of the corresponding point (the amount of displacement) becomes 96+64=160 pixels, and this allows correctly deriving the parallax of the corresponding point. In this manner, as illustrated in FIG. 7, the distance image 126 in which the distance can be relatively clearly understood can be obtained. Hereinafter, the specific configuration of the exterior environment recognition device 120 will be stated, and the specific processing for achieving this kind of pattern matching will be explained therein.

(Exterior Environment Recognition Device 120)

Figure 8:
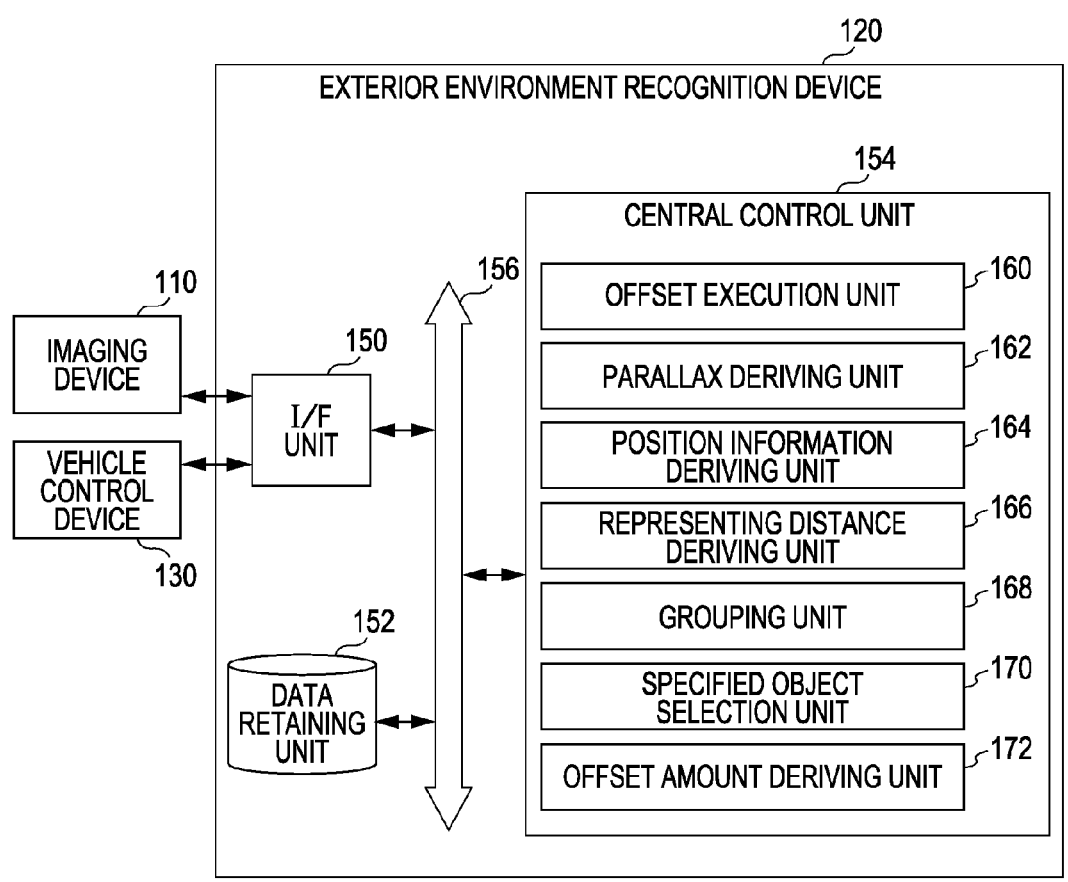
FIG. 8 is a functional block diagram schematically illustrating functions of an exterior environment recognition device.

FIG. 8 is a functional block diagram schematically illustrating functions of the exterior environment recognition device 120. As shown in FIG. 8, the exterior environment recognition device 120 includes an I/F unit 150, a data retaining unit 152, and a central control unit 154.

The I/F unit (image data obtaining unit) 150 is an interface for interactive information exchange with the imaging device 110 and the vehicle control device 130, and obtains two pieces of image data generated by the two imaging devices 110, for example. The data retaining unit 152 is constituted by a RAM, a flash memory, an HDD, and the like, and retains various kinds of information required for processing performed by each functional unit explained below. In addition, the data retaining unit 152 temporarily retains the luminance image 124 received from the imaging devices 110.

The central control unit 154 is comprised of a semiconductor integrated circuit including, for example, a central processing unit (CPU), a ROM storing a program and the like, and a RAM serving as a work area, and controls the I/F unit 150 and the data retaining unit 152 through a system bus 156. In the present embodiment, the central control unit 154 also functions as an offset execution unit 160, a parallax deriving unit 162, a position information deriving unit 164, a representing distance deriving unit 166, a grouping unit 168, a specified object selection unit 170, and an offset amount deriving unit 172.

The offset execution unit 160 offsets one of the search ranges in the images based on the two pieces of image data obtained from the imaging devices 110, in a direction for reducing the horizontal parallax, by the number of pixels corresponding to the amount of offset derived in the previous frame by the offset amount deriving unit 172 explained later. In the present embodiment, the entire comparison image of the images based on the two pieces of image data is offset in the left direction of the screen in accordance with the specified object selected by the specified object selection unit 170 explained later (selected specified object). For example, in the above example, the image is offset in the left direction by 64 pixels.

With such offset execution unit 160, the search range 214 of the search target is maintained, and therefore, a specified object located in proximity can be stably detected without unnecessarily increasing the processing load.

In this case, the offset execution unit 160 offsets the entire image, but may offset only the search range of the image range corresponding to the selected specified object (in the present embodiment, the entire comparison image). In this manner, while a selected specified object located in proximity is appropriately detected, a specified object in other ranges can be detected.

However, the offset amount deriving unit 172 derives a significant amount of offset (other than zero) only when the relative distance of the specified object is less than a threshold value determined in advance (only when the specified object is located in proximity), and until then, zero is employed as the amount of offset. Therefore, until the relative distance of the specified object becomes less than a threshold value, the offset execution unit 160 offsets the image by zero, i.e., the offset execution unit 160 substantially does not offset the comparison image.

As described above, when the relative distance of the specified object becomes less than the threshold value, the offset execution unit 160 offsets the comparison image, so that it is possible to continuously detect the specified object (selected specified object). However, existence of a specified object suddenly appears in front of the subject vehicle 1 is not recognized by the exterior environment recognition device 120 itself, and therefore, the offset amount deriving unit 172 cannot detect the amount of offset, and the offset execution unit 160 cannot offset the image. More specifically, it is impossible to detect a specified object in front of the subject vehicle 1.

Accordingly, regardless of the relative distance of the selected specified object, the offset execution unit 160 offsets, in a fixed manner, the search range (In the present embodiment, the entire comparison image) by the amount of offset defined in advance, in a predetermined area determined in advance at both ends in the horizontal direction of the image based on the image data.

Figure 9A:
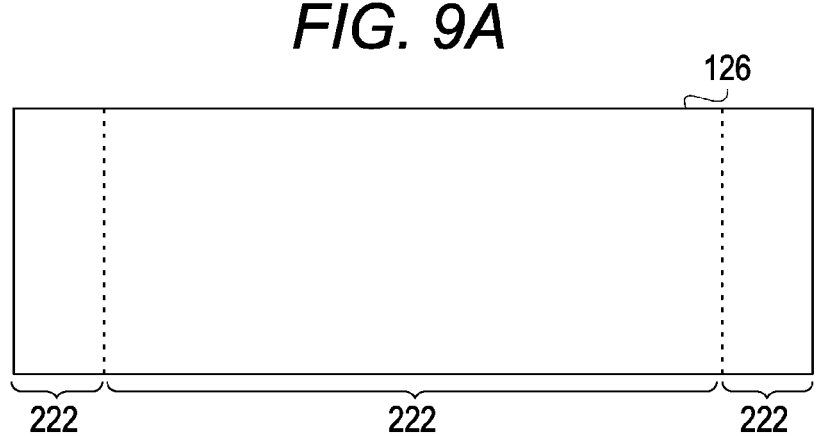
FIGS. 9A and 9B are explanatory diagrams explaining processing of an offset execution unit.
Figure 9B:
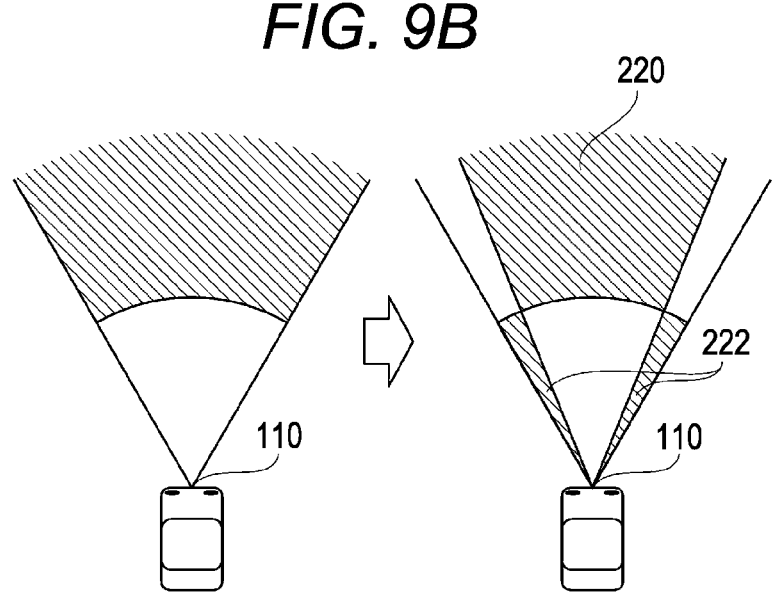

FIGS. 9A and 9B are explanatory diagrams explaining processing of the offset execution unit 160. As illustrated in FIG. 9A, the distance image 126 that is obtained by offsetting the comparison image in accordance with the amount of offset derived by the offset amount deriving unit 172 from the previous frame is displayed in a central area 220 of the distance image 126. In parallel with that, the distance image 126 that is offset by the amount of offset determined in advance (for example, 128 pixels) is displayed in the predetermined area 222 at both ends in the horizontal direction of the distance image 126.

As described above, only the predetermined area 222 at both ends in the horizontal direction of the distance image 126 are offset by 128 pixels, so that the detectable range is as illustrated in FIG. 9B, and in the predetermined area 222, a specified object located in proximity with a relative distance of 1.8 m to 3.6 m can be detected. Therefore, even when a specified object suddenly appears in front of the subject vehicle 1, the specified object can be detected, and appropriate processing can be performed.

In the above configuration, the reason why the predetermined area 222 at both of the right and left in the horizontal direction are adopted as the target of fixed offset is that, during cruising on a road, a specified object supported or fixed on a road would not abruptly appear from the upper side or the lower side of the image, and it is not necessary to consider the upper and lower (vertical) direction. In this case, when appearance from the upper side and the lower side of the image is expected, a predetermined area 222 may be likewise provided at end portions in the vertical direction, or it may be possible to cope with it in time-series as explained below.

For example, regardless of the relative distance of the selected specified object which is the specified object, the offset execution unit 160 may offset the search range (In the present embodiment, the entire comparison image) by the amount of offset determined in advance, with a cycle determined in advance, e.g., every 60 frames. In this manner, abrupt appearance of a specified object in all the directions in the image can be coped with.

The parallax deriving unit 162 compares two pieces of image data one of which (in this case, the comparison image) is offset by the offset execution unit 160, and extracts a block 212 highly correlated with any block 210 including one or more pixels in the image based on one of the image data (reference image), from the search range 214 of which size is determined in advance in the image based on the other of the image data (comparison image). Then, the parallax between both blocks is obtained and adopted as parallax information.

The position information deriving unit 164 uses the stereo method to convert parallax information for each block in the detection area 122 of the distance image 126 into three-dimensional position information including the width direction x, the height direction y, and the depth direction z. The parallax information represents a parallax of each block in the distance image 126, whereas the three-dimensional position information represents information about the relative distance of each block in the real world. When the parallax information is not derived by the pixel but is derived by the block, that is, a calculation may be executed in units of pixels with the parallax information being deemed as parallax information about all the pixels which belong to a block.

Figure 10:
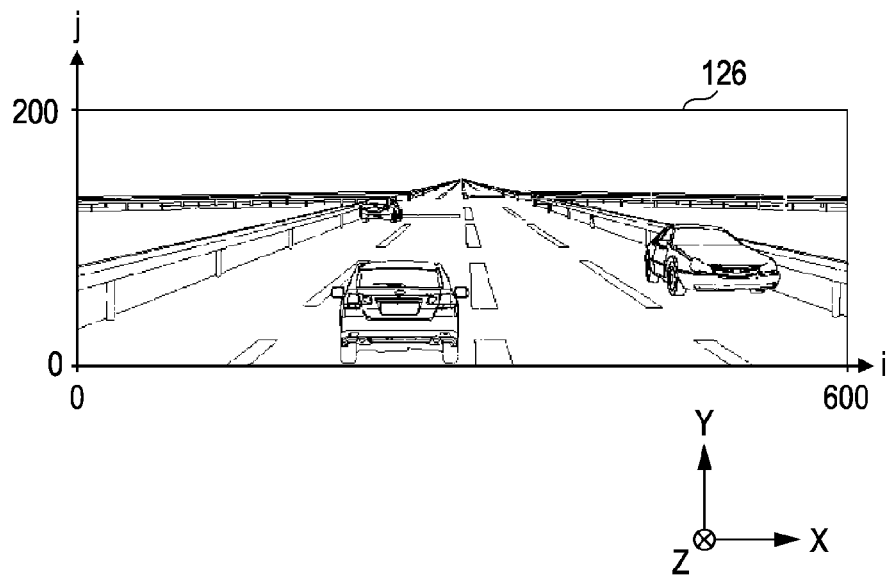
FIG. 10 is an explanatory diagram for explaining conversion into three-dimensional position information performed by a position information deriving unit.

FIG. 10 is an explanatory diagram for explaining conversion into three-dimensional position information performed by the position information deriving unit 164. First, the position information deriving unit 164 treats the distance image 126 as a coordinate system in a pixel unit as shown in FIG. 10. In FIG. 10, the lower left corner is adopted as an origin (0, 0). The horizontal direction is adopted as an i coordinate axis, and the vertical direction is adopted as a j coordinate axis. Therefore, a pixel having a parallax can be represented as (i, j, dp) using a pixel position i, j and the parallax information dp representing parallax.

The three-dimensional coordinate system in the real world according to the present embodiment will be considered using a relative coordinate system in which the subject vehicle 1 is located in the center. The right side of the direction in which the subject vehicle 1 moves is denoted as a positive direction of X axis, the upper side of the subject vehicle 1 is denoted as a positive direction of Y axis, the direction in which the subject vehicle 1 moves (front side) is denoted as a positive direction of Z axis, and the crossing point between the road surface and a vertical line passing through the center of two imaging devices 110 is denoted as an origin (0, 0, 0). When the road is assumed to be a flat plane, the road surface matches the X-Z plane (y=0). The position information deriving unit 164 uses (formula 1) to (formula 3) shown below to transform the coordinate of the pixel (i, j, dp) in the distance image 126 into a three-dimensional point (x, y, z) in the real world. $x = CD/2 + z \cdot PW \cdot (i - IV)$ ... (formula 1) $y = CH + z \cdot PW \cdot (j - JV)$ ... (formula 2) $z = KS/dp$ ... (formula 3) Here, CD denotes an interval (baseline length) between the imaging devices 110, PW denotes a corresponding distance in the real world to a distance between adjacent pixels in the image, so-called like an angle of view per pixel, CH denotes an disposed height of the imaging device 110 from the road surface, IV and JV denote coordinates (pixels) in the image at an infinity point in front of the subject vehicle 1, and KS denotes a distance coefficient (KS=CD/PW). In this case, when the offset execution unit 160 executes offset of a significant amount of offset, i.e., when the amount of offset is not zero, a new relative distance is made by adding the amount of offset to z corresponding to the relative distance.

The position information deriving unit 164 derives the height from the road surface on the basis of the detection distance (for example, the number of pixels) in the distance image 126 between a point on the road surface located at the same relative distance as the block and the relative distance of the block.

However, when the offset execution unit 160 executes offset of a significant amount of offset, the position information deriving unit 164 limits deriving of the relative distance in an image other than the image range corresponding to the selected specified object (does not execute at all or does not execute unless a predetermined condition is satisfied).

Figure 11A:
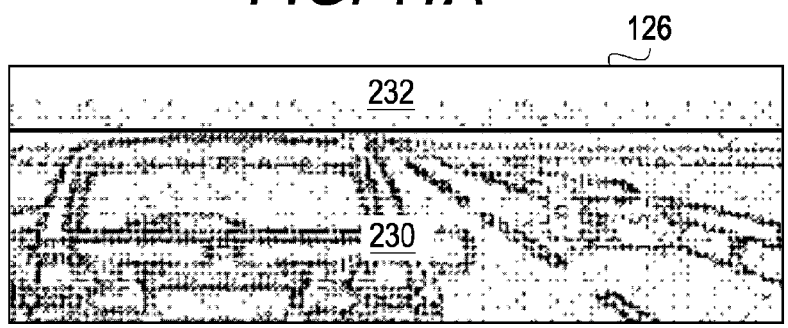
FIGS. 11A and 11B are explanatory diagrams for explaining processing of the position information deriving unit.
Figure 11B:
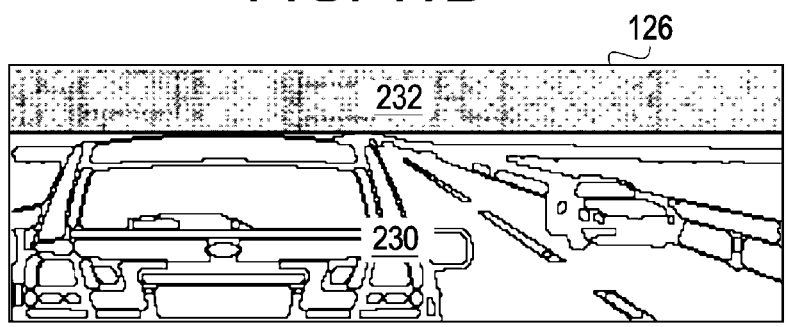

FIGS. 11A and 11B are explanatory diagrams for explaining processing of the position information deriving unit 164. In the distance image 126 of FIG. 11A which is not offset, the relative distance of the area 230 corresponding to the selected specified object is unclear, but by offsetting the image, the relative distance of the area 230 corresponding to the selected specified object is made clear as illustrated in FIG. 11B.

Therefore, by offsetting the image, the relative distance of the area 232 corresponding to a specified object at a distance of which parallax is equal to or less than the amount of offset, of which relative distance was clear before the image was offset, becomes unclear.

Accordingly, when it is expected in advance that the relative distance cannot be obtained by offsetting the image when the position information deriving unit 164 derives the relative distance, the position information deriving unit 164 determines not to derive the relative distance of the area 232, thus avoiding unnecessary increase of the processing load.

At this occasion, the position information deriving unit 164 may limit deriving of the relative distance only when the relative distance in the previous frame of a specified object included in an image other than the image range corresponding to the selected specified object is less than the amount of offset.

For example, even out of the image range corresponding to the selected specified object, when a specified object included therein exists at a relatively close distance and the parallax thereof is equal to or more than the amount of offset, the parallax can be derived correctly even if the image was offset by the amount of offset. Accordingly, when the relative distance of the specified object in an image other than the image range corresponding to the selected specified object is less than the amount of offset, deriving of the relative distance is limited, and when it is equal to or more than the amount of offset, the relative distance is derived as it is. In this manner, a correct relative distance can be derived in a wide range.

First, the representing distance deriving unit 166 divides the detection area 122 of the distance image 126 into multiple divided areas in the horizontal direction. Subsequently, for the blocks located above the road surface, the representing distance deriving unit 166 generates a histogram by adding the relative distance included in each predetermined distance divided into multiple sections, for each divided area based on the position information. Then, the representing distance deriving unit 166 derives the representing distance corresponding to the peak of the added distance distribution. In this case, "corresponding to the peak" means a peak value or a value satisfying any given condition close to the peak.

Figure 12A:
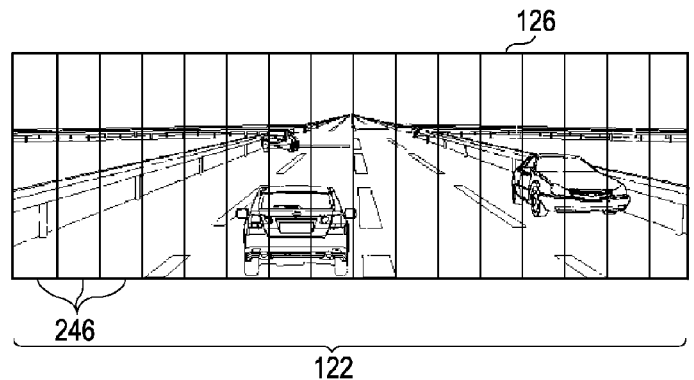
FIGS. 12A and 12B are explanatory diagrams for explaining divided area and representing distances.
Figure 12B:
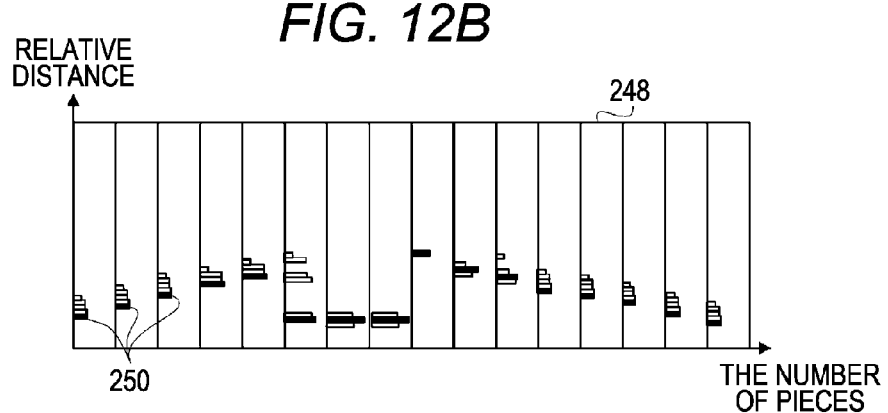

FIGS. 12A and 12B are explanatory diagrams for explaining divided areas 246 and representing distances 250. When the distance image 126 as illustrated in FIG. 10 is divided into multiple sections in the horizontal direction, the divided areas 246 are in rectangular shapes as illustrated in FIG. 12A. Originally, for example, 150 rows of which horizontal width is four pixels are arranged as the divided areas 246 in the rectangular shapes, but in this case, for the sake of explanation, the detection area 122 is divided into 16 sections.

Subsequently, when the representing distance deriving unit 166 refers to the relative distances of all the blocks in each divided area 246, and generates a histogram (represented as a wide rectangle (bar) in FIG. 12B), a distance distribution 248 as illustrated in FIG. 12B is obtained. In this case, in the vertical direction, the divided predetermined distance is represented, and in the horizontal direction, the number of blocks of which relative distance is included in the divided predetermined distance is represented. However, FIG. 12B is a virtual screen for calculation, and actually, a visual screen is not generated in the process. Then, the representing distance deriving unit 166 refers to the distance distribution 248 thus derived, and identifies a representing distance (indicated by a rectangle filled with black in FIG. 6B) 250 which is the relative distance corresponding to the peak.

First, the grouping unit 168 successively compares the representing distance 250 between adjacent divided areas 246, and groups the divided areas 246 of which representing distance 250 is close (for example, located as close as 1 m or less), thus generating one or more divided area groups. At this occasion, even when representing distances 250 are close in three or more divided areas 246, all the continuous divided areas 246 are combined as a divided area group.

Figure 13:
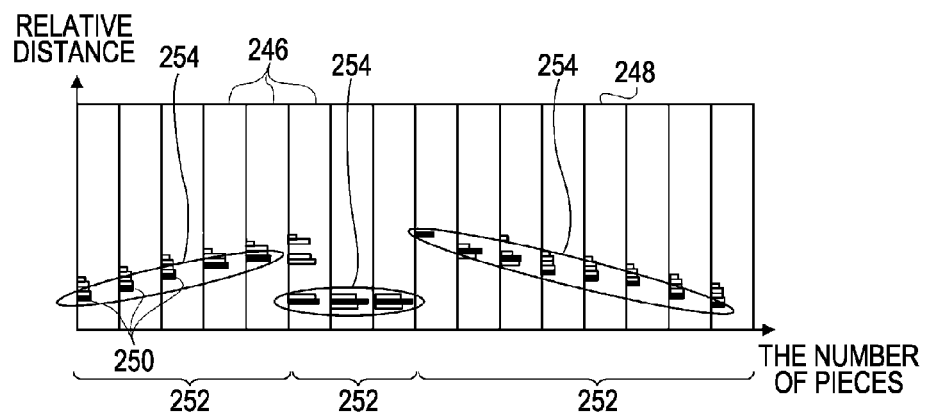
FIG. 13 is an explanatory diagram for explaining divided area groups.

FIG. 13 is an explanatory diagram for explaining divided area groups 252. The grouping unit 168 compares the divided areas 246, and groups the representing distances 250 as illustrated in FIG. 13 (grouped, virtual groups 254). With such grouping, the grouping unit 168 can identify a specified object located above the road surface. The grouping unit 168 can recognize the group 254 is which of a rear portion, a side portion of a preceding vehicle, an object and the like arranged along the road such as a guardrail, on the basis of the transition of the relative distance in the horizontal direction and the vertical direction in the grouped divided area groups 252.

Subsequently, the grouping unit 168 identifies a specified object such as a preceding vehicle in accordance with the relative positional relationship with the subject vehicle 1, and divides the detection area of the image into one or more areas in accordance with an external edge of the specified object.

Figure 14:
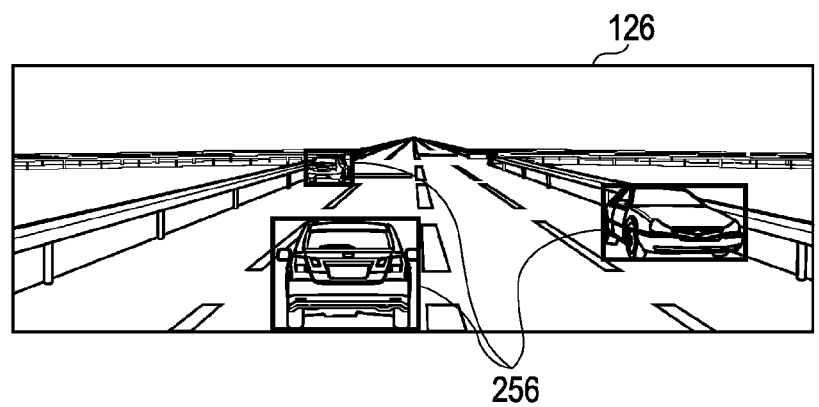
FIG. 14 is an explanatory diagram for explaining processing of a grouping unit.

FIG. 14 is an explanatory diagram for explaining processing of the grouping unit 168. A specified area may be represented in various shapes determined in advance that accommodate the external edge, but in this case, as illustrated in FIG. 14, is represented by a rectangular frame 256. More specifically, first, a block of which relative distance z corresponds to the representing distance 250 within the divided area group 252 generated by the divided area group 252 is adopted as a base point, the grouping unit 168 performs grouping process assuming that blocks of which difference of a horizontal distance x, difference of a height y, and difference of a relative distance z with respect to the block adopted as the base point is within a range determined in advance (for example, 0.1 m) correspond to the same specified object. The range is represented as a distance in the real world, and can be set at any given value by a manufacturer and a driver. The grouping unit 168 also groups blocks which are newly added by grouping process, such that the grouping unit 168 further groups blocks of which difference of the horizontal distance x from the block serving as the base point, of which difference of the height y from the block serving as the base point, and of which difference of the relative distance z from the block serving as the base point are within a predetermined range. As a result, all the blocks that can be provisionally determined to be the same specified object are grouped.

In the above description, each of the difference in the width direction x, the difference in the height direction y and the difference in the depth direction z is independently determined, and only when all of them are included within the predetermined range, the target portions are grouped into a the same group. However, grouping processing may be performed using another calculation. For example, when Euclidean distance, square root of ((difference in the width distance x)2+(difference of in the height direction y)2+(difference in the depth direction z)2), is included within a predetermined range, target portions may be grouped into the same group. With such calculation, distances between blocks in the real world can be derived accurately, and therefore, grouping accuracy can be enhanced.

Subsequently, when a grouped block group made by the grouping unit 168 satisfies a condition determined in advance, the grouping unit 168 determines that the block group is a specified object. For example, when the grouped block group is located on a road, the grouping unit 168 determines whether the size of the entire block group corresponds to the size of the specified object "vehicle" or not, and when it is determined to correspond to the size of the specified object "vehicle", the grouping unit 168 determines that the block group is the specified object "vehicle". Then, the grouping unit 168 determines that an area (frame 256) occupied on the screen by the block group that is determined to be the specified object "vehicle" is the specified area of the vehicle.

The specified object selection unit 170 selects a specified object (selected specified object) which is to be a target of tracking, from among one or more specified objects specified by the grouping unit 168. Then, the specified object selection unit 170 tracks the selected specified object thus selected. In the present embodiment, a vehicle (preceding vehicle) located in front of the subject vehicle 1 that is more likely to be collide with as compared with others is adopted as the selected specified object. Various kinds of existing methods can be used as such selection means and tracking means of a selected specified object, and therefore, in this case, the detailed explanation thereabout is omitted.

The offset amount deriving unit 172 derives the amount of offset of the search range in accordance with the relative distance when the relative distance of the specified object selected by the specified object selection unit is less than the threshold value, e.g., 4.9 m.

Figure 15:
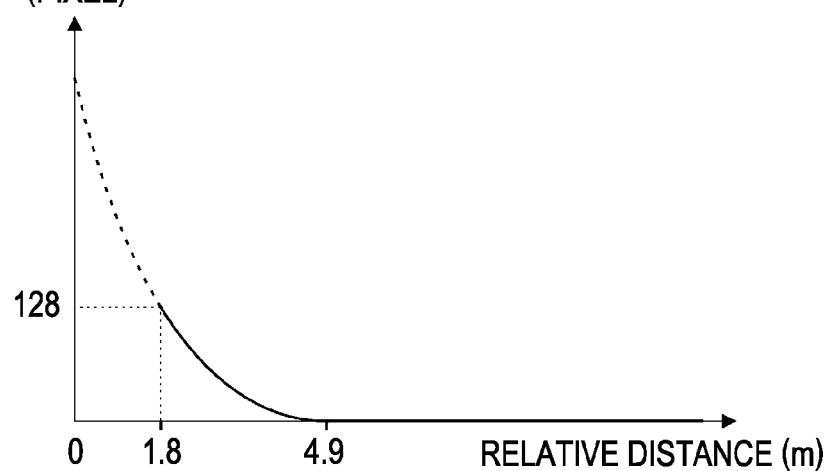
FIG. 15 is an explanatory diagram for explaining processing of an offset amount deriving unit.

FIG. 15 is an explanatory diagram for explaining processing of the offset amount deriving unit 172. As described above, in the pattern matching, when the relative distance becomes less than 4.9 m, a significant amount of offset is begun to be derived, so that corresponding points can be detected in proximity to 96 pixels in the search range 214 of the comparison image. The amount of offset is obtained by subtracting 96 pixels from the number of pixels corresponding to the expected value of the relative distance in the subsequent frame of the selected specified object. For example, when the number of pixels corresponding to the expected value of the relative distance in the subsequent frame is 160 pixels, the amount of offset is as follows: 160−96=64 pixels. Therefore, in the graph of FIG. 15 illustrating the relationship between the relative distance of the selected specified object and the amount of offset, while the relative distance of the selected specified object is equal to or more than 4.9 m (corresponding to 96 pixels), the amount of offset is zero, and when the relative distance of the selected specified object becomes less than 4.9 m, the amount of offset increases as the relative distance thereof decreases. The amount of offset thus derived is used for processing of the offset execution unit 160 in the subsequent frame.

When the relative distance of the selected specified object is less than the threshold value as described above, the amount of offset is derived in accordance with the relative distance, and for this amount of offset, the offset execution unit 160 offsets the image, so that a specified object located in proximity can be stably detected without unnecessarily increasing the processing load.

The relative distance in the subsequent frame of the selected specified object may be as follows: the relative distance of the current frame may be used as the expected value of the subsequent frame as it is, but in accordance with the behavior of the selected specified object, the relative distance of the selected specified object in the subsequent frame may be expected, and the value thus obtained may be used.

For example, the offset amount deriving unit 172 may derive the relative speed of the selected specified object from two pieces of image data taken at different times, e.g., image data of the previous frame and the current frame, add the displacement of the selected specified object at the relative speed to the relative distance in the current frame of the selected specified object, on the basis of the relative distance in the current frame of the selected specified object and the relative speed, and derive the amount of offset of the search range 214 in the subsequent frame.

For example, suppose that the subject vehicle 1 is cruising at 40 km/h, and the preceding vehicle is cruising at 30 km/h. This means that the preceding vehicle is approaching the subject vehicle 1 at the relative speed 10 km/h, i.e., the preceding vehicle is approaching about 46 mm per one frame. Accordingly, the displacement of such relative speed (46 mm) is subtracted from the preceding vehicle is approaching in the current frame of the selected specified object, whereby the amount of offset in the subsequent frame can be estimated.

In this manner, the relative distance in the subsequent frame of the selected specified object can be estimated with a high degree of accuracy, and the image is offset by the amount of offset based on such relative distance, whereby the relative distance in the subsequent frame of the selected specified object can be detected in proximity to the threshold value (in this case, 96 pixels).

(Exterior Environment Recognition Method)

Figure 16:
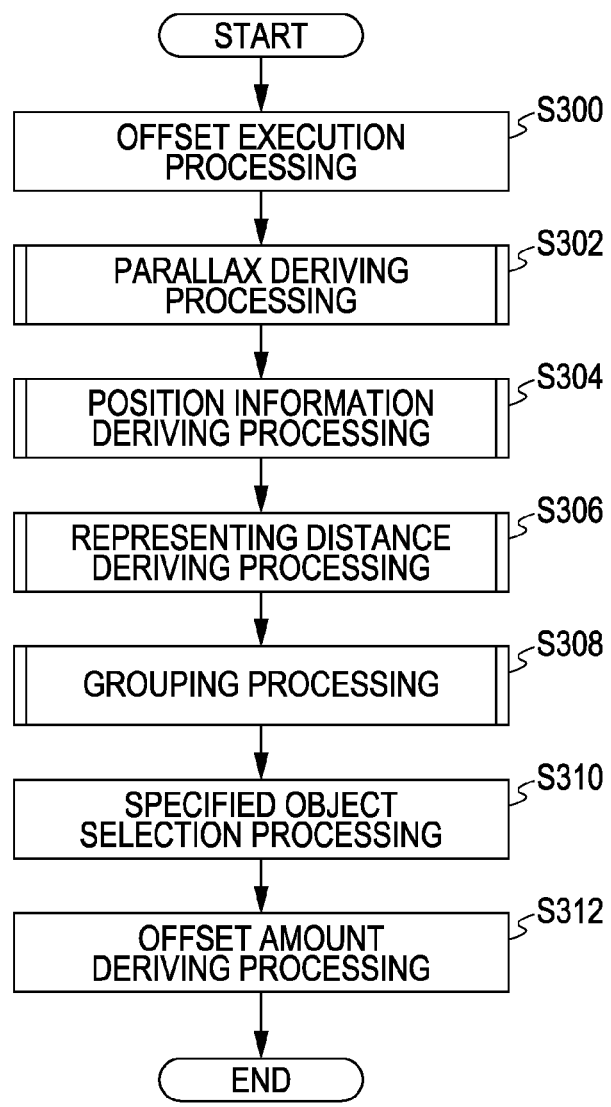
FIG. 16 is a flowchart illustrating overall flow of an exterior environment recognition method.

Hereinafter, specific processing of the exterior environment recognition device 120 will be explained with reference to the flowcharts of FIGS. 16 to 20. FIG. 16 illustrates overall flow of interrupt processing when the exterior environment recognition device 120 transmits the luminance image 124 and the distance image 126. FIGS. 17 to 20 illustrate individual subroutines therein. In this case, pixels or blocks are used as target portions of processing, and the lower left corners of the luminance image 124 and the distance image 126 are origins. With the blocks, the processing is performed according to the exterior environment recognition method in a range of 1 to 150 blocks in the horizontal direction of the image and 1 to 50 blocks in the vertical direction of the image. With the pixels, the processing is performed according to the exterior environment recognition method in a range of 1 to 600 pixels in the horizontal direction of the image and 1 to 200 pixels in the vertical direction of the image.

When an interrupt occurs according to the environment recognition method, the offset execution unit 160 offsets the comparison image by the number of pixels corresponding to the amount of offset derived in the previous frame by the offset amount deriving unit 172 (S300). Then, parallax deriving unit 162 compares the two pieces of image data, and extracts a block highly correlated with any given block in the reference image from the search range 214 of the comparison image, and obtains parallax of both of the blocks (S302).

Subsequently, the position information deriving unit 164 converts parallax information of each block within the detection area 122 of into three-dimensional position information (S304). The representing distance deriving unit 166 derives the representing distance 250 of each divided area 246 (S306), and the grouping unit 168 groups the blocks on the basis of such representing distance 250 (S308).

Then, the specified object selection unit 170 selects a specified object (selected specified object) which is to be a target of tracking, from among one or more specified objects specified by the grouping unit 168, and tracks the selected specified object (S310). When the relative distance of the selected specified object is less than the threshold value, e.g., 4.9 m, the offset amount deriving unit 172 derives the amount of offset of the search range in accordance with the relative distance as illustrated in FIG. 15 (S312). Hereinafter, the above processing will be explained more specifically.

(Parallax Deriving Processing S302)

Figure 17:
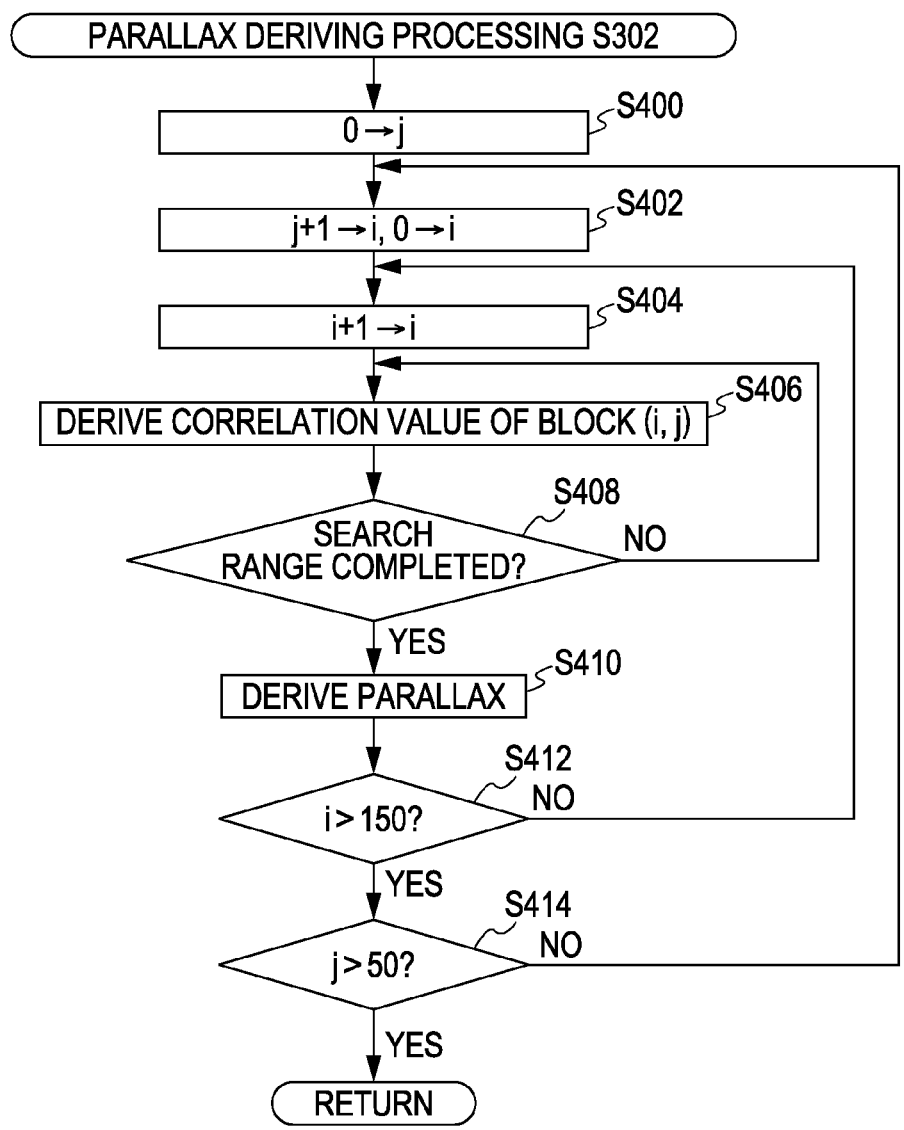
FIG. 17 is a flowchart illustrating a flow of parallax deriving processing.

As shown in FIG. 17, the parallax deriving unit 162 initializes a vertical variable j for identifying a block (substitutes "0" thereinto) (S400). Subsequently, the parallax deriving unit 162 adds "1" to the vertical variable j, and initializes (substitutes "0" to) the horizontal variable i (S402). Subsequently, the parallax deriving unit 162 adds "1" to the horizontal variable i (S404).

The parallax deriving unit 162 derives the correlation value between a block (i, j) of the reference image and a block (i, j) of the comparison image obtained by shifting in the right direction of the screen by one pixel (S406). Such deriving of the correlation value is repeated until the search range 214 is completed (NO in S408). When the search range 214 is completed (YES in S408), the parallax deriving unit 162 extracts a block (i, j) of the comparison image of which correlation value with the block (i, j) of the reference image is the highest, and derives parallax information dp indicating the distance between both of the blocks (parallax) (S410).

Subsequently, the parallax deriving unit 162 determines whether or not the horizontal variable i is more than 150, i.e., the maximum value of horizontal block (S412), and when the horizontal variable i is determined not to be more than the maximum value (NO in S412), the processing is repeated from step S404. When the horizontal variable i is determined to be more than the maximum value (YES in S412), the parallax deriving unit 162 determines whether or not the vertical variable j is more than 50, i.e., the maximum value of vertical block (S414). Then, when the vertical variable j is determined not to be more than the maximum value (NO in S414), the processing is repeated from step S402. When the vertical variable j is determined to be more than the maximum value (YES in S414), the parallax deriving processing S302 is terminated. In this manner, the block (i, j) of the distance image 126 is made into the block (i, j, dp) added with the parallax information dp.

(Position Information Deriving Processing S304)

Figure 18:
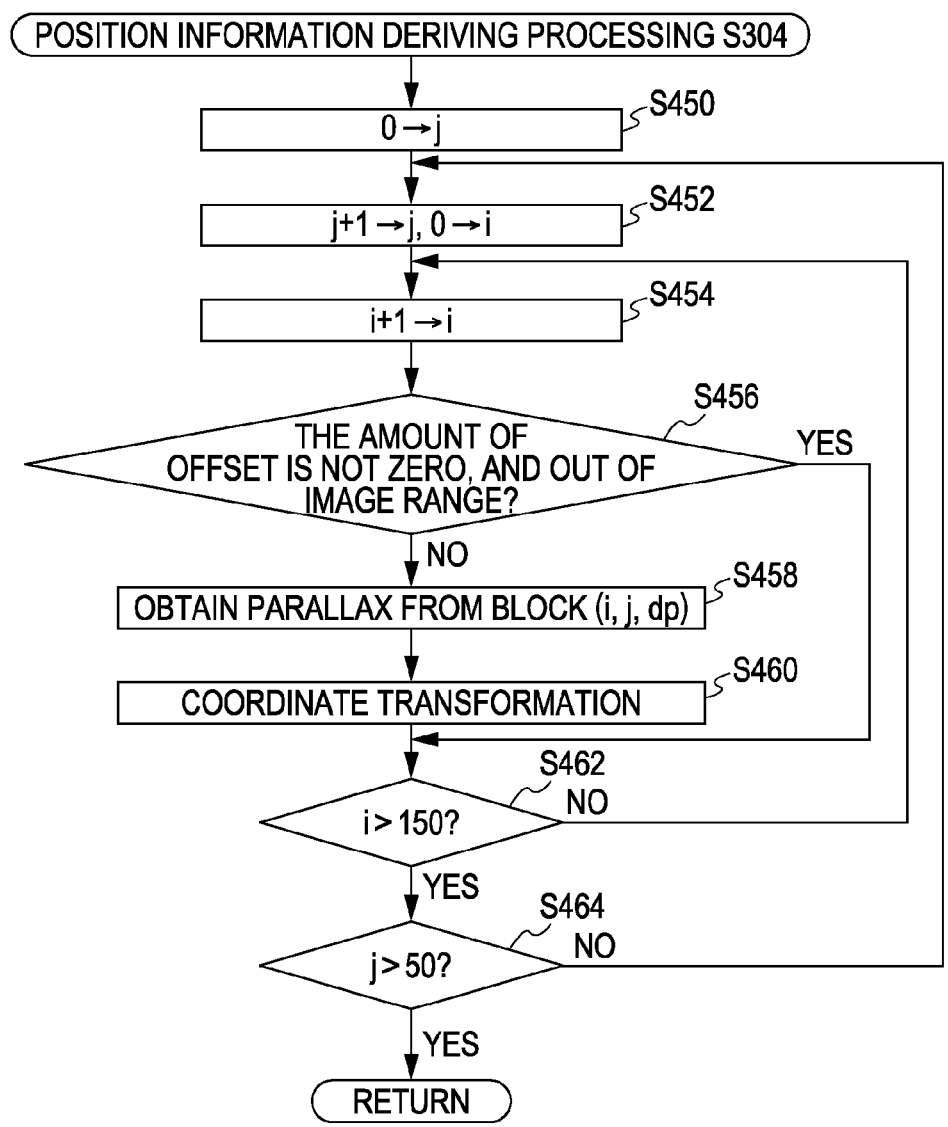
FIG. 18 is a flowchart illustrating a flow of position information deriving processing.

As shown in FIG. 18, the position information deriving unit 164 initializes a vertical variable j for identifying a block (substitutes "0" thereinto) (S450). Subsequently, the position information deriving unit 164 adds "1" to the vertical variable j, and initializes (substitutes "0" to) the horizontal variable i (S452). Subsequently, the position information deriving unit 164 adds "1" to the horizontal variable i (S454).

Subsequently, the position information deriving unit 164 determines whether the amount of offset is not zero, and the block (i, j, dp) is a block in a range other than the image range corresponding to the selected specified object (S456). When the amount of offset is determined not to be zero, and the block (i, j, dp) is determined to be a block in a range other than the image range corresponding to the selected specified object (YES in S456), the coordinate conversion processing is omitted, and step S462 is subsequently performed. When the amount of offset is determined to be zero, and the block (i, j, dp) is determined to be a block in the image range corresponding to the selected specified object (NO in S456), the position information deriving unit 164 obtains the parallax information dp from the block (i, j, dp) of the distance image 126 (S458). Then, the position information deriving unit 164 uses the above formulas 1 to 3 to transform the coordinate of the block (i, j, dp) including the parallax information dp into the coordinate of the point (x, y, z) in the real world, thereby making the block (i, j, dp, x, y, z) (S460). At this occasion, when the amount of offset is not zero, the amount of offset is added to the relative distance z, to obtain a new relative distance z.

Subsequently, the position information deriving unit 164 determines whether or not the horizontal variable i is more than 150, i.e., the maximum value of horizontal block (S462), and when the horizontal variable i is determined not to be more than the maximum value (NO in S462), the processing is repeated from step S454. When the horizontal variable i is determined to be more than the maximum value (YES in S462), the position information deriving unit 164 determines whether or not the vertical variable j is more than 50, i.e., the maximum value of vertical block (S464). Then, when the vertical variable j is determined not to be more than the maximum value (NO in S464), the processing is repeated from step S452. When the vertical variable j is determined to be more than the maximum value (YES in S464), the position information deriving processing S304 is terminated. As described above, the parallax information dp of the distance image 126 is transformed into the three-dimensional position information.

(Representing Distance Deriving Processing S306)

Figure 19:
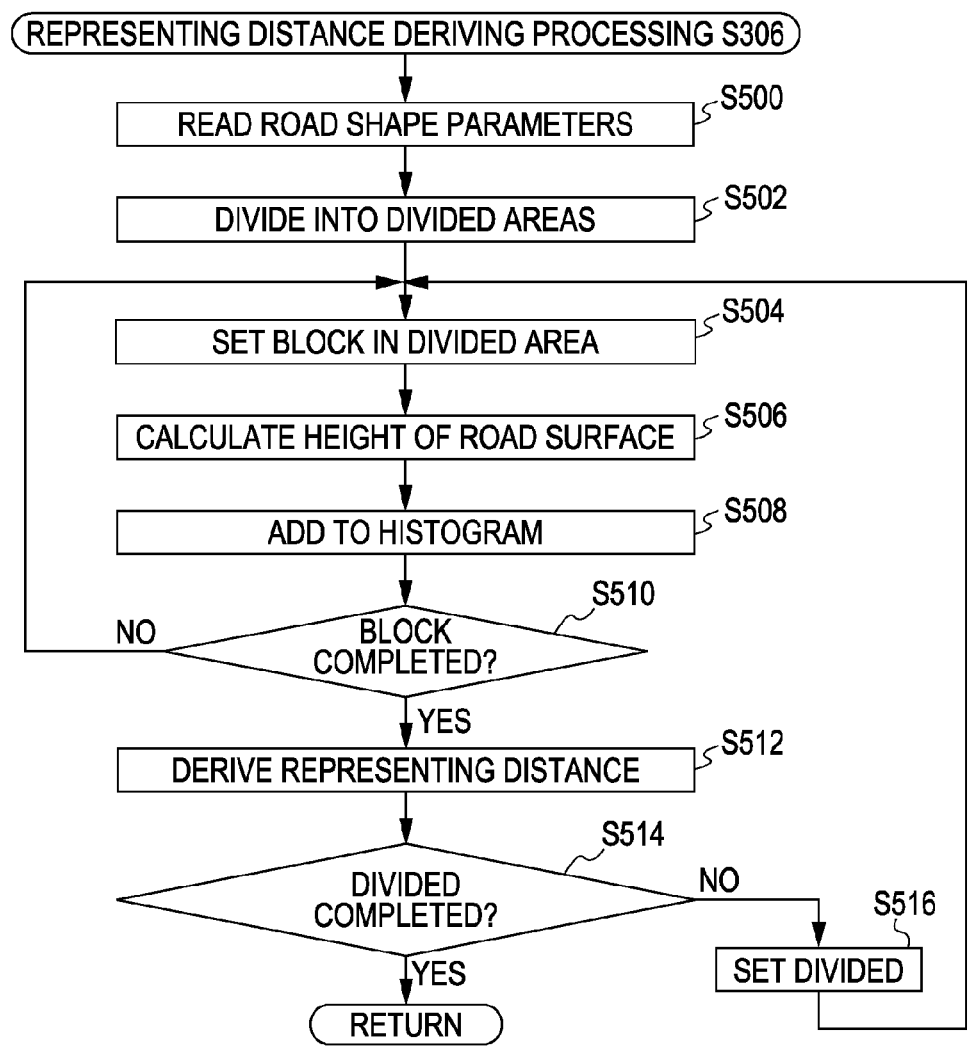
FIG. 19 is a flowchart illustrating a flow of representing distance deriving processing.

As illustrated in FIG. 19, the representing distance deriving unit 166 reads road shape parameters (S500), and divides the detection area 122 into 150 divided areas 246 in units of, e.g., four pixels, in the horizontal direction (S502). Subsequently, representing distance deriving unit 166 successively extracts one divided area 246 from the 150 divided areas 246 thus divided, starting from, e.g., the left side of the horizontal direction, and sets any given block (i, j, dp, x, y, z) existing within the divided area 246 (S504).

The representing distance deriving unit 166 calculates the height yr on the road surface at the coordinate z of the block in the real world (S506), and when the block is such that the coordinate y of the block in the real world is equal to or more than the height yr of the road surface, the relative distance thereof is added (voted) to the histogram divided with an interval of a predetermined distance (S508). In this case, even when the coordinate y of the block in the real world is equal to or more than the height yr of the road surface, a block of which height from the road surface is equal to or less than 0.1 m is deemed as a white line, dirt, shadow, and the like on the road, and is excluded from the processing target. Even a block located above the height of the subject vehicle 1 is deemed as a footbridge, a sign, and the like, and is excluded from the processing target.

The representing distance deriving unit 166 determines whether adding processing is performed on the histogram, for all the blocks within the divided area 246 extracted (S510). In this case, when all the blocks are not completed (NO in S510), processing is repeated from step S504 for the blocks on which the adding processing to the histogram has not yet been performed.

When all the blocks are completed (YES in S510), the representing distance deriving unit 166 refers to the histogram thus generated, and when there is a section where the degree of the histogram (the number of relative distances) is equal to or more than the threshold value (which is set appropriately), the representing distance deriving unit 166 determines that there is a specified object in the divided area 246. Then, the representing distance deriving unit 166 adopts the relative distance corresponding to the peak as a representing distance 250 (S512).

Then, the representing distance deriving unit 166 determines whether the deriving processing of the representing distance 250 has been performed or not for all the multiple divided areas 246 (S514). In this case, when all the divided areas 246 are determined to have been completed (NO in S514), a new divided area 246 is set (S516), and processing is repeated from step S504 for the new divided area 246. On the other hand, when all the deriving processing of the representing distance 250 is completed (YES in S514), the representing distance deriving processing S306 is terminated.

(Grouping Processing S308)

As illustrated in FIG. 20, the grouping unit 168 successively specifies any given divided area 246 from the multiple divided areas 246, starting from, e.g., the left side in the horizontal direction, and also specifies a divided area 246 adjacent to the right side of the any given divided area 246 in the horizontal direction (S550). Then, the grouping unit 168 determines whether the representing distances 250 exist in both of the divided areas 246 (S552). In this case, when the representing distances 250 don't exist in both of the divided areas 246 (NO in S552), the processing of the completion determination of the divided area in step S558 is subsequently performed. On the other hand, when the representing distances 250 exist in both of the divided areas 246 (YES in S552), the representing distances 250 in both of the divided areas 246 are compared (S554).

In this case, when the difference between both of the representing distances 250 is equal to or less than a threshold value determined in advance (value which can be deemed as the same specified object), both of the representing distances 250 are deemed to be close to each other, and the grouping unit 168 groups the divided areas 246 to make a divided area group 252 (S556). At this occasion, one of the divided areas 246 is already set as the divided area group 252, the other of the divided areas 246 is unified to the divided area group 252.

Then, the grouping unit 168 determines whether setting processing S552, S554, S556 of the divided area group 252 is performed or not for all the multiple divided areas 246 (S558). At this occasion, when all is completed (NO in S558), a new divided area 246 is set (S560), and processing is repeated from step S550 for the new divided area 246. On the other hand, when all the setting processing of the divided area group 252 is completed (YES in S558), subsequent step S562 is performed.

Subsequently, the grouping unit 168 successively extracts one divided area group 252 from the multiple divided area groups 252 made into the group, starting from, e.g., the left side in the horizontal direction, and sets any given block (i, j, dp, x, y, z) existing within the divided area group 252 (S562).

The grouping unit 168 compares the block (i, j, dp, x, y, z) thus set with the block of which relative distance z corresponds to the representing distance 250 within the divided area group 252, and determines whether a difference of a horizontal distance x, a difference of a height y, and a difference of a relative distance z is within a range determined in advance (for example, 0.1 m) (S564). When they are within the range determined in advance (YES in S564), the grouping process is performed while assuming that the block corresponds to the same specified object (S566). When they are not within the range determined in advance (NO in S564), the processing of the completion determination of the block in step S568 is subsequently performed.

The grouping unit 168 determines whether the grouping processing is performed or not for all the blocks within the divided area group 252 extracted (S568). At this occasion, when the grouping processing of all the blocks is not yet completed (NO in S568), processing is repeated from step S562 for the blocks on which the grouping processing has not yet been performed.

When the grouping processing of all the blocks is completed (YES in S568), the grouping unit 168 determines whether the size of the entire block group made into the group corresponds to the size of the specified object "vehicle" (S570). When it is determined to correspond to the size of the specified object "vehicle" (YES in S570), the block group is specified as a specified object "vehicle" (S572). When it is determined not to correspond to the size of the specified object "vehicle" (NO in S570), the processing of the completion determination of the divided area group 252 in step S574 is subsequently performed.

Then, the grouping unit 168 determines whether specifying processing S570, S572 of the specified object is performed or not for all the multiple divided area groups 252 (S574). At this occasion, when all the divided area groups 252 are determined to have been completed (NO in S574), a new divided area group 252 is set (S576), and processing is repeated from step S562 for the new divided area group 252. On the other hand, when all the specifying processing S570, S572 of the specified object has been completed (YES in S574), the grouping processing S308 is terminated.

In the grouping process, further, positional relationship of the multiple groups with each other is determined. For example, when the positions of the end points of the groups of the same type of the specified object are close to each other, and transition of the relative distance in the horizontal direction and the vertical direction within the specified object is substantially the same (continuous), they are determined to be the same surface of the same specified object, and these groups are unified into one group. The transition of the relative distance in the horizontal direction and the vertical direction within the specified object at this occasion can be specified by linear approximation by the Hough transform or the least squares method. In a case of a preceding vehicle, multiple groups can also be unified into one group when the relative movement distance concerning the z coordinate is the same.

When the above processing is performed in units of blocks, the same information is set to all the pixels within all the blocks, whereby the processing in units of pixels can be performed.

Hereinabove, according to the exterior environment recognition device 120 and the exterior environment recognition method explained above, unnecessary processing load that may be caused by offsetting the image can be avoided, and while maintaining the processing time, not only a specified object far away but also a specified object located in proximity can be detected stably.

In addition, a program for allowing a computer to function as the exterior environment recognition device 120 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

For example, in the above embodiment, the imaging devices 110 obtain monochrome images, but the embodiment is not limited thereto. The present embodiment can also be carried out by obtaining a color image including three color phases (R (red), G (green), B (blue)).

In the present embodiment, the offset execution unit 160, the parallax deriving unit 162, the position information deriving unit 164, the representing distance deriving unit 166, the grouping unit 168, the specified object selection unit 170, and the offset amount deriving unit 172 are configured to operate with software with the central control unit 154. However, the functional units may be configured with hardware.

The steps of the environment recognition method in this specification do not necessarily need to be processed chronologically according to the order described in the flowchart. The steps may be processed in parallel, or may include processings using subroutines.

The invention claimed is:

1. An exterior environment recognition device comprising:
   an image data obtaining unit for obtaining two pieces of image data generated by two image-capturing units of which stereo axes are on a same plane but provided at different positions;
   a parallax deriving unit for comparing the two pieces of image data, extracting a block highly correlated with any given block including one or more pixels in an image based on one of the image data, from a search range, of which size is determined in advance, in an image based on the other of the image data, and obtaining parallax of both of the blocks;
   a position information deriving unit for deriving a relative distance of the block from the parallax;
   a grouping unit for grouping a block of which difference of the relative distance is included within a predetermined range, and specifying one or more specified objects;
   a specified object selection unit for selecting a specified object which is to be a tracking target, from the one or more specified objects;
   an offset amount deriving unit, wherein when the relative distance of the selected specified object, which is the specified object that has been selected, becomes less than a threshold value determined in advance, the offset amount deriving unit derives an amount of offset for offsetting the search range in accordance with the relative distance; and
   an offset execution unit for offsetting the search range based on one of the two pieces of image data by the amount of offset,
   wherein when the amount of offset is not zero, the position information deriving unit limits deriving of the relative distance in an image other than an image range corresponding to the selected specified object.

2. The exterior environment recognition device according to claim 1, wherein regardless of the relative distance of the selected specified object, the offset execution unit offsets the image in areas determined in advance at both ends in the horizontal direction of the image based on the image data, by the amount of offset determined in advance.

3. The exterior environment recognition device according to claim 1, wherein regardless of the relative distance of the selected specified object which is the specified object, the offset execution unit offsets the search range by the amount of offset determined in advance, for a cycle determined in advance.

4. The exterior environment recognition device according to claim 2, wherein regardless of the relative distance of the selected specified object which is the specified object, the offset execution unit offsets the search range by the amount of offset determined in advance, for a cycle determined in advance.

5. The exterior environment recognition device according to claim 1, wherein the offset execution unit offsets the search range only in an image range corresponding to the selected specified object among the image based on the image data.

6. The exterior environment recognition device according to claim 2, wherein the offset execution unit offsets the search range only in an image range corresponding to the selected specified object among the image based on the image data.

7. The exterior environment recognition device according to claim 3, wherein the offset execution unit offsets the search range only in an image range corresponding to the selected specified object among the image based on the image data.

8. The exterior environment recognition device according to claim 1, wherein the offset amount deriving unit derives a relative speed of the selected specified object from the two pieces of image data taken at different times, and derives the amount of offset on the basis of the relative speed and the relative distance of the selected specified object.

9. The exterior environment recognition device according to claim 2, wherein the offset amount deriving unit derives a relative speed of the selected specified object from the two pieces of image data taken at different times, and derives the amount of offset on the basis of the relative speed and the relative distance of the selected specified object.

10. The exterior environment recognition device according to claim 3, wherein the offset amount deriving unit derives a relative speed of the selected specified object from the two pieces of image data taken at different times, and derives the amount of offset on the basis of the relative speed and the relative distance of the selected specified object.

11. The exterior environment recognition device according to claim 4, wherein the offset amount deriving unit derives a relative speed of the selected specified object from the two pieces of image data taken at different times, and derives the amount of offset on the basis of the relative speed and the relative distance of the selected specified object.

12. The exterior environment recognition device according to claim 1, wherein the position information deriving unit limits deriving of the relative distance in an image other than an image range corresponding to the selected specified object, only when the relative distance of the specified object is less than the amount of offset.

13. The exterior environment recognition device according to claim 2, wherein the position information deriving unit limits deriving of the relative distance in an image other than an image range corresponding to the selected specified object, only when the relative distance of the specified object is less than the amount of offset.

14. The exterior environment recognition device according to claim 2, wherein the position information deriving unit limits deriving of the relative distance in an image other than an image range corresponding to the selected specified object, only when the relative distance of the specified object is less than the amount of offset.

15. The exterior environment recognition device according to claim 3, wherein the position information deriving unit limits deriving of the relative distance in an image other than an image range corresponding to the selected specified object, only when the relative distance of the specified object is less than the amount of offset.

16. The exterior environment recognition device according to claim 4, wherein the position information deriving unit limits deriving of the relative distance in an image other than an image range corresponding to the selected specified object, only when the relative distance of the specified object is less than the amount of offset.

17. The exterior environment recognition device according to claim 5, wherein the position information deriving unit limits deriving of the relative distance in an image other than an image range corresponding to the selected specified object, only when the relative distance of the specified object is less than the amount of offset.

* * * * *